US005587241A

United States Patent [19]
Vaughan et al.

[11] Patent Number: 5,587,241
[45] Date of Patent: Dec. 24, 1996

[54] MINERAL FIBERS AND WHISKERS EXHIBITING REDUCED MAMMALIAN CELL TOXICITY, AND METHOD FOR THEIR PREPARATION

[76] Inventors: Gerald L. Vaughan, 2417 W. Gallaher Ferry Rd., Knoxville, Tenn. 37932; Samuel C. Weaver, 5440 Glen Cove Dr., Knoxville, Tenn. 37919

[21] Appl. No.: 457,851

[22] Filed: Jun. 1, 1995

[51] Int. Cl.$^6$ ...................................................... D02G 3/00
[52] U.S. Cl. .......................... 428/375; 428/113; 428/378; 428/391; 428/408; 428/367
[58] Field of Search ...................................... 428/408, 375, 428/378, 391, 367, 113

[56] References Cited

U.S. PATENT DOCUMENTS

| | | | |
|---|---|---|---|
| 2,531,571 | 11/1950 | Hyde | 428/391 |
| 2,563,288 | 8/1951 | Steinmann | 428/391 |
| 3,845,986 | 12/1974 | Chvalovsky et al. | 428/391 |
| 4,188,454 | 2/1980 | Foley et al. | 428/391 |
| 4,636,437 | 1/1987 | Algrim et al. | 428/391 |
| 4,642,265 | 2/1987 | Suzuki | 428/375 |
| 4,761,316 | 8/1988 | Ogawa | 428/64 |
| 4,766,013 | 8/1988 | Warren | 428/367 |
| 4,873,069 | 10/1989 | Weaver et al. | 423/345 |
| 4,981,822 | 1/1991 | Singh et al. | 501/95 |
| 5,051,301 | 9/1991 | Singh et al. | 428/378 |
| 5,091,271 | 2/1992 | Sawaki et al. | 428/367 |
| 5,162,270 | 11/1992 | Ownby et al. | 501/95 |
| 5,209,976 | 5/1993 | Ogawa | 428/391 |
| 5,376,427 | 12/1994 | Singh et al. | 428/408 |
| 5,432,255 | 7/1995 | Singh et al. | 428/408 |

OTHER PUBLICATIONS

Author: Vaughan, Jordan, Karr, *The Toxicity, in Vitro, of Silicon Carbide Whiskers.* 12–04–1990, pp. 57–67.
Author: Vaughan, Kennedy, Trently, *The Immediate Effects of Silicon Carbide Whiskers upon Ciliated Tracheal Epithelium.* 02–20–1991, pp. 178–185.
Author: Vaughan, Trently, Wilson, *Pulmonary Response, in Vivo, to Silicon Carbide Whiskers.* 05–09–1992. pp. 191–201.
Author: Noll, *Chemistry & Technology of Silicones.* 1968, pp. 578–585, 446.

*Primary Examiner*—Newton Edwards
*Attorney, Agent, or Firm*—Pitts & Brittian, P.C.

[57] ABSTRACT

An abatement of the cytotoxicity to cells caused by mineral fibers/whiskers through the surface treatment of the fibers/whiskers with a material that changes the surface structure which eradicate charge and confer hydrophobicity. By pretreating the fibers/whiskers with such materials, an industrial hygiene problem occurring in the fabrication and handling of mineral fibers/whiskers is significantly reduced. Studies were conducted on mouse embryo cells and fetal lung cells, with essentially complete abatement of cytotoxicity when the mineral fibers/whiskers are treated with a silicone.

4 Claims, 5 Drawing Sheets

5,587,241

MINERAL FIBERS AND WHISKERS EXHIBITING REDUCED MAMMALIAN CELL TOXICITY, AND METHOD FOR THEIR PREPARATION

TECHNICAL FIELD

The present invention relates to a form of mineral fibers and whiskers, such as those of silicon carbide, that exhibit reduced toxicity to living mammalian cells. More specifically, it relates to mineral fibers and whiskers having a surface modification that substantially reduces any reaction between the fiber or whisker and the cell to thereby reduce the toxicity.

BACKGROUND ART

Mineral fibers and whiskers have been extolled for many years as a strengthening agent for many types of bodies: polymer, ceramic, metal, cermet, etc. By incorporating such finely-divided structures, there is a reinforcing binding that inhibits deleterious cracking. Various fibers and whiskers have been utilized/proposed, including but not limited to alumina, silicon carbide, boron carbide, etc. The principal fiber/whisker for this application has been silicon carbide. A typical description of the potential benefits is set forth in U.S. Pat. No. 5,162,270 issued to Ownby, et al on Nov. 10, 1992. Any appropriate portion of this patent is incorporated herein by reference. Of course, there are many other references to the use of fibers and whiskers for strengthening structures.

It has been determined, however, that silicon carbide fibers and whiskers, and probably a number of other mineral fibers and whiskers, pose a serious industrial health hazard that is at least as great as the hazard created by asbestos fibers. It is not known why the cell ingests the fiber/whisker, but the problem has been known to exist for many years. The problem apparently does not exist to any extent after a reinforced product has been produced (e.g., it is not primarily a public health problem); rather, the problem occurs during the fabrication and handling of the raw fibers/whiskers and thus is an industrial health hazard. This has resulted in halting the fabrication of mineral fibers/whiskers in most countries, with Japan and the United States being the only countries where limited fabrication continues.

The designation hereinafter of "fiber/whisker" is used to designate both fiber and whisker materials, or only one of the materials. Fibers are generally considered to be polycrystalline materials while whiskers are considered to be single crystal material. The health risk is primarily associated with these fibers and/or whiskers that are sufficiently small to be respirable.

Information describing the toxicity of silicon carbide whiskers is reported in, for example, the following publications. Other typical publications related to this toxicity are cited therein.

"The Toxicity, in Vitro, of Silicon Carbide Whiskers" Gerald L Vaughan, et al, *Environmental Research*, 56, 57–67 (1991);

"The Immediate Effects of Silicon Carbide Whiskers Upon Tracheal Epithelium" *Environmental Research*, 56, 178–185 (1991);

"Pulmonary Response, in Vivo, to Silicon Carbide Whiskers", *Environmental Research*, 63, 191–201 (1993).

Accordingly it is an object of the present invention to provide a mineral fiber/whisker for use in structure strengthening, etc. that has a reduced toxicity toward living mammalian cells.

A further object of the present invention is to produce a hydrophobic mineral fiber/whisker to substantially reduce the potential for interaction between the fiber/whisker and living mammalian cells within the pulmonary airways.

Another object of the present invention is to provide a silicone-type coating upon mineral fibers/whiskers to prevent intimate contact between the fiber/whisker itself and living mammalian cells to substantially reduce toxicity to these cells.

It is also an object of the present invention to provide a silicon carbide fiber/whisker having a coating thereon whereby the resultant fiber/whisker has substantially reduced toxicity to living mammalian cells.

Also, it is an object of the present invention to provide a method for the preparation of a mineral fiber/whisker having the reduced toxicity such that operations can be more safely resumed in preparing such mineral fibers/whiskers for use in strengthening and other applications of these materials.

These and other objects of the present invention will become apparent upon a consideration of the following detailed description of the invention.

SUMMARY OF THE INVENTION

In accordance with the present invention, there is provided a coated mineral fiber/whisker that substantially reduces the toxicity of the fiber/whisker with living tissue, i.e, mammalian cells. The invention is specifically applied to silicon carbide and crocidolite asbestos fibers/whiskers, with the coating being a organic halogenated silane or silicone. In the case of the silicon carbide structures, the cytotoxicity was essentially eliminated, and for the crocidolite the toxicity was reduced by at least 50%. In view of the results, beneficial results are expected with the coating applied to other similar materials that demonstrate toxicity when not coated. Other coating materials that confer hydrophobicity to the fiber/whisker are within the scope of the invention.

BEST MODE FOR CARRYING OUT THE INVENTION

Figure 1:
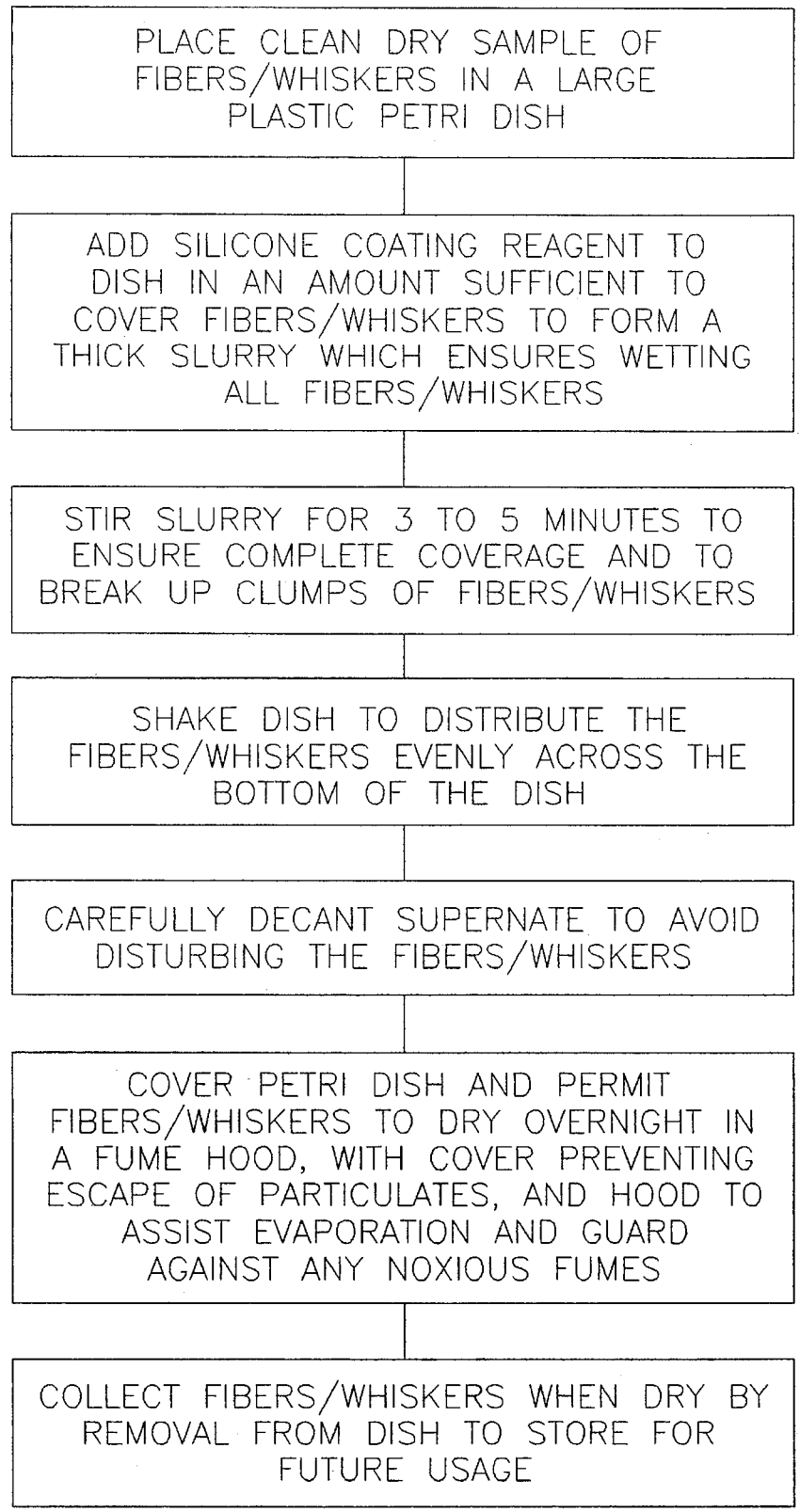
FIG. 1 is a flow diagram depicting the treatment of fibers/whiskers with a silicone prior to their testing for cytotoxicity with mouse cells.

Whiskers utilized for the study of cytotoxicity to cells were of two types: 1.5 micrometer diameter silicon carbide whiskers manufactured according to U.S. Pat. No. 4,873,069 issued to S. C. Weaver, et al on Oct. 10, 1989, and incorporated herein by reference; and 0.4 micrometer diameter crocidolite asbestos supplied by Los Alamos National Laboratory, Los Alamos, N. Mex. The cytotoxicity of these whiskers was tested in a standard manner using BALB/3T3 embryonic mouse cells (clone A31) and fetal lung cells (WI-38) as obtained from American Type Culture Collection, Rockville, Md. The testing procedure is detailed in the first of the above-cited publications (which dealt only with the testing with mouse cells—an identical test procedure was used for the fetal lung cells). As reported therein, a very high proportion of the mouse embryo cells were killed when placed in contact with either of these whiskers.

In order to ascertain ways to reduce the cytotoxicity due to the whiskers, a portion were coated with a silicone substance prior to their contact with the cells. A silicone was chosen solely on the basis that such has been shown to impart a non-wetting characteristic to vessels in contact with liquids. The procedure for the preparation of the test whiskers is set forth in the "flow diagram" of FIG. 1. As set forth, steps were taken to assure that all fibers/whiskers were completely coated, and that clumping of the coated fibers/whiskers was prevented in the final dried product. The specific silicone product used in the tests was "Silicote" manufactured by Sigma Chemical Co. of St. Louis, Mo. However, many materials of the class of organic halogenated silanes, siloxanes or silicones can be utilized. One such material is organo-chlorosilane, particularly methyl-chlorosilane. It will be recognized that for large-scale preparation, other equipment and quantities are to be used. However, the steps for such preparation will result in the separated, but coated, fibers/whiskers.

As detailed in the cytotoxity test procedures, embryonic mouse cells were exposed to the coated and dried fiber product, and the number of colonies of cells forming after treatment was observed using conventional identification methods. Each cell that survives normally produces one colony.

Several standard tests are available for determining cytotoxicity, including dye exclusion and chromium leak assays. These provide estimates of cell death occurring soon after exposure to test agents. However, a more meaningful test is one that will provide information about the survival of cells over an extended time period for it is known that detrimental effects of fibers/whiskers are usually not detected quickly. To accomplish such a test, cells were seeded at 300 cells per 60 mm culture dish and incubated for twenty-four hours to allow attachment. These cells were then exposed to the appropriate fibers/whiskers at varying concentrations. After a seven day incubation to allow for development of colonies, plates were fixed in methanol and stained with giemsa stain. Colonies composed of fifty cells or more were counted visually with an inverted phase microscope. Controls of similar passage were assayed concurrently. The results were expressed with colony forming efficiency (percent of the control value) as a function of fiber concentration (microgram/cm$^2$).

Figure 2:
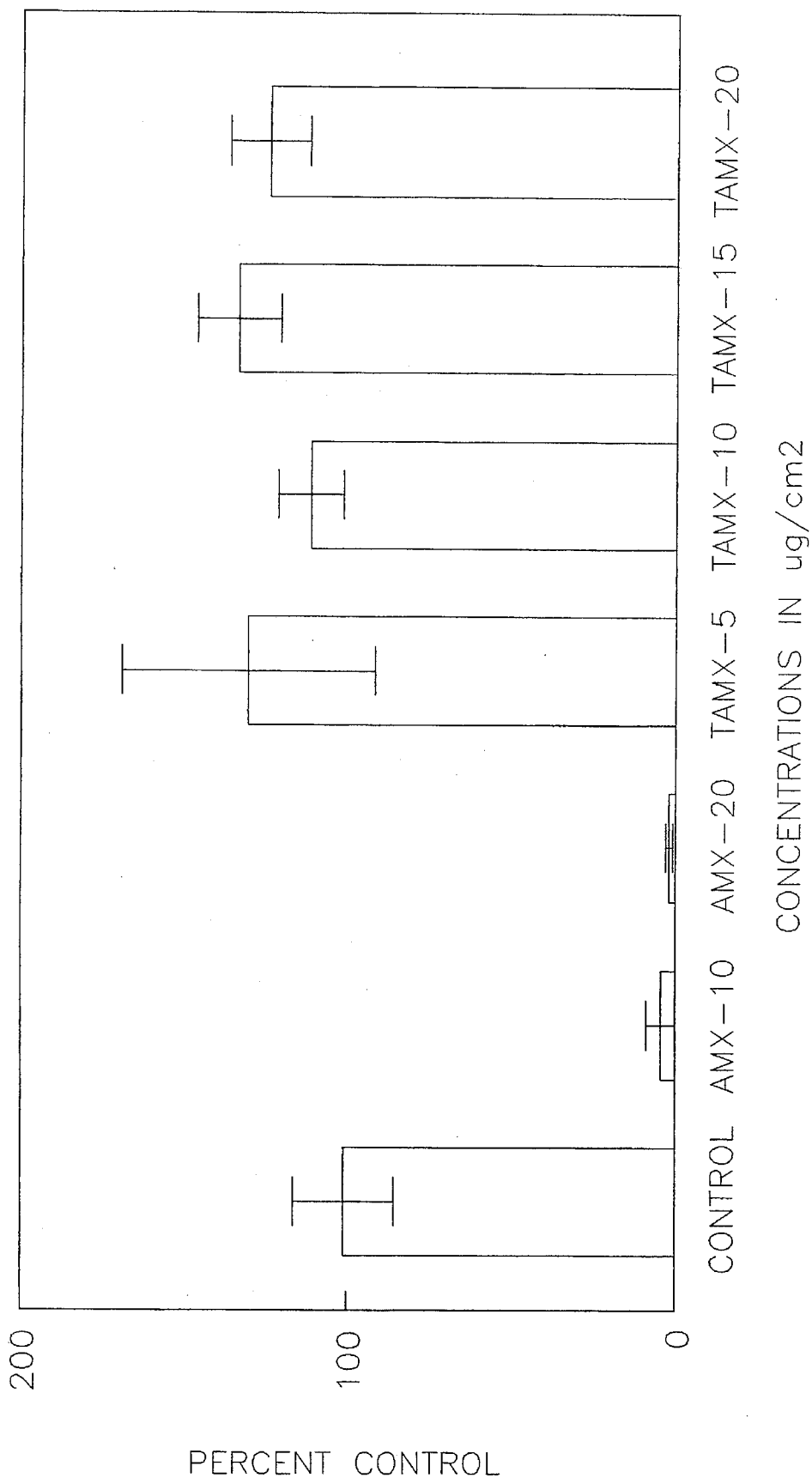
FIG. 2 depicts representative results of cytotoxicity tests comparing silicone-coated silicon carbide whiskers with untreated samples of the same during the culturing of mouse cells.

The results for silicon carbide whiskers are shown in FIG. 2 where they are compared with a control and with untreated whiskers. The designation AMX is used for the untreated material, while the TAMX designates the silicone coated material. The numbers after each of these designations (e.g., 5, 10, 20) indicate the dose in micrograms per square centimeter of the culture plate surface. The vertical I-shaped bar in each of the result plots represents the standard deviation for the experiment.

The data illustrated in FIG. 2 demonstrates that untreated silicon carbide whiskers produce a high mortality to the cells (absence of colonies), the mortality increasing with the dose. In contrast, the mortality due to coated whiskers is substantially zero: the colony production was essentially the same as the control. There appeared to be no effect caused by the size of the dose.

Figure 3:
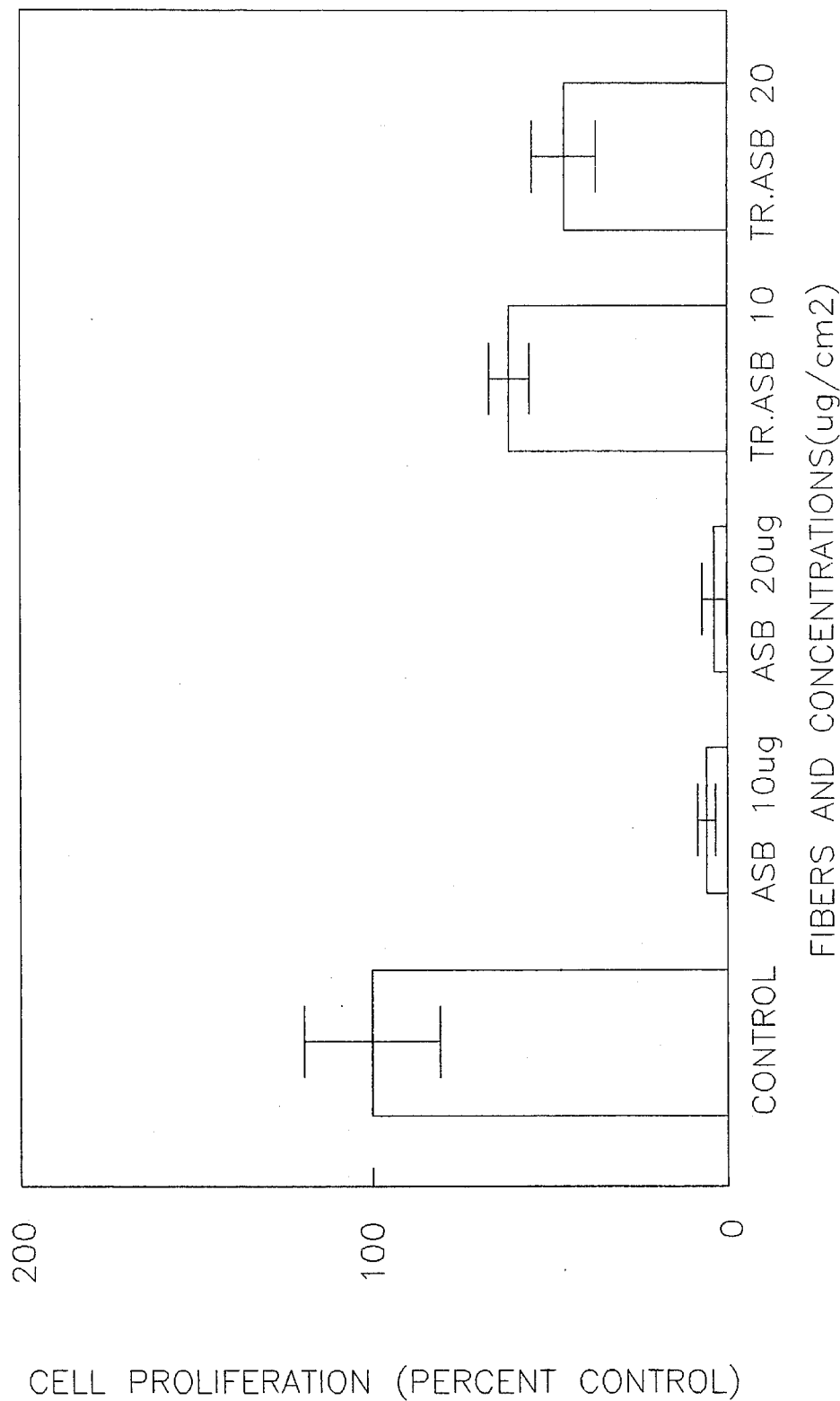
FIG. 3 depicts representative results of cytotoxicity tests comparing similarly coated crocidolite asbestos fibers with untreated samples of the same during the culturing of mouse cells.

A corresponding study was made using crocidolite asbestos fibers. Coated fibers of this material were prepared in the same manner as illustrated in FIG. 1. Again, the coated fibers were compared with a control (no fibers) and with non-coated fibers. Although the results, which are shown in FIG. 3, do not indicate a complete abatement of the toxic effect upon cell colony development in this test, a significant improvement was obtained when compared to non-coated material.

Figure 4:
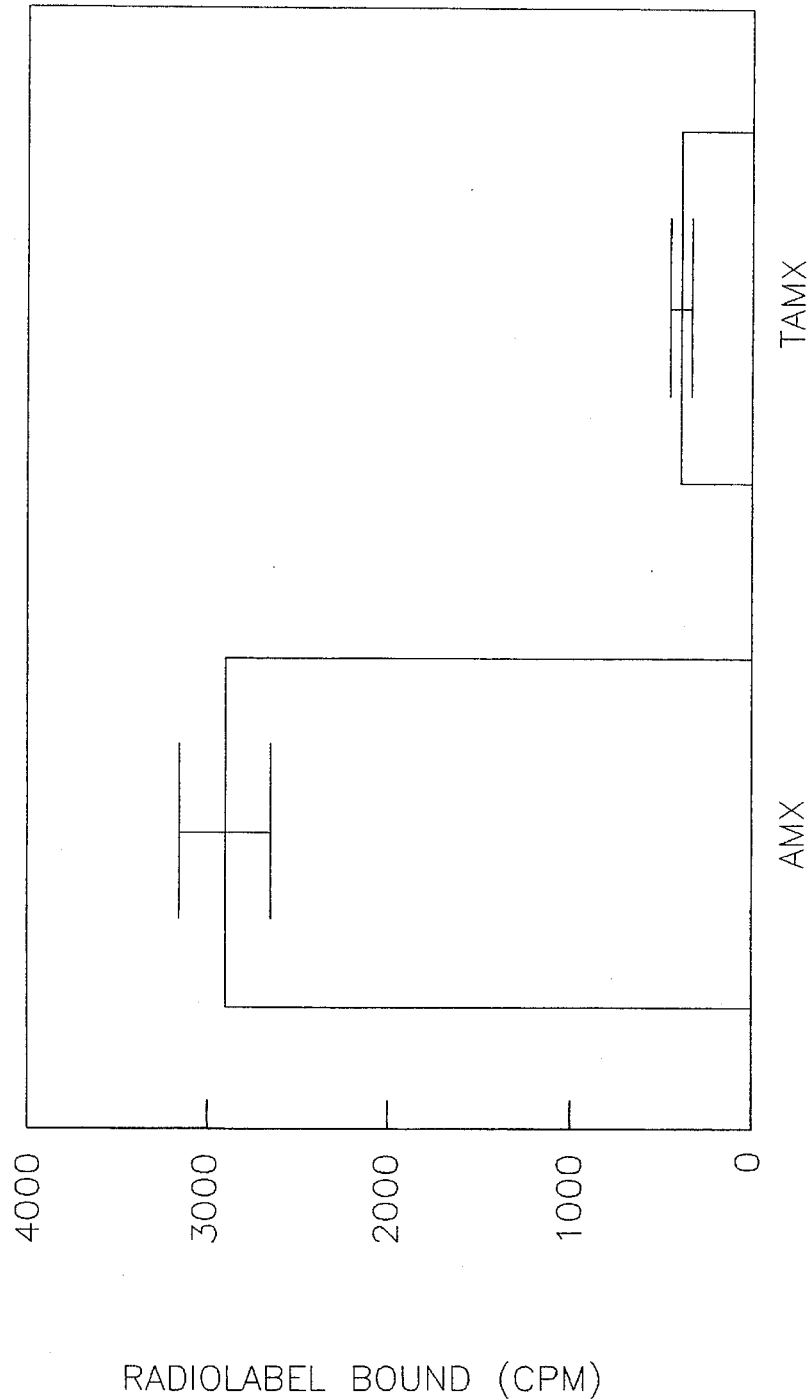
FIG. 4 depicts a differential binding assay, using radio labelled protein, for fibers/whiskers as untreated and treated to show change in surface bonding characteristics.

In order to help identify the characteristic(s) of the coated product, a study was made of the protein bonding exhibited by the product. The results are illustrated in FIG. 4, where it is seen that essentially no protein bonding exists for the coated whiskers, but significant bonding exists for uncoated whiskers. Accordingly, this data indicates that the silicone coated whiskers are biologically inert as compared to untreated whiskers.

The potential for a cell to "transform" under conditions of contact with materials is often used to ascertain whether those materials can cause the formation of tumorous and/or cancerous cells. Untransformed cells exhibit a density-dependent growth habit, forming monolayers of cells in culture. Neoplastic transformation is observed in cultured cells by the development of "transformed foci" where the descendants of transformed cells exhibit uncontrolled growth and pile up or grow in clumps of cells several layers thick. Such growth is easily detected in culture, as well known in the art.

A study was made of the degree of transformation of mouse cells in the presence of fibers/whiskers when they are treated in accordance with the present invention versus those that had not been treated. Cells were plated on plastic petri dishes or Falcon flasks and allowed to attach and grow for twenty-four hours. The test material was then added to the culture at a concentration of 0.5 to 10 micrograms per square centimeter of plate surface. After two to ten days, cultures were washed and replated for determination of cell transformation. Colonies were stained, scored and classified according to morphology after two, four and eight generations.

Figure 5:
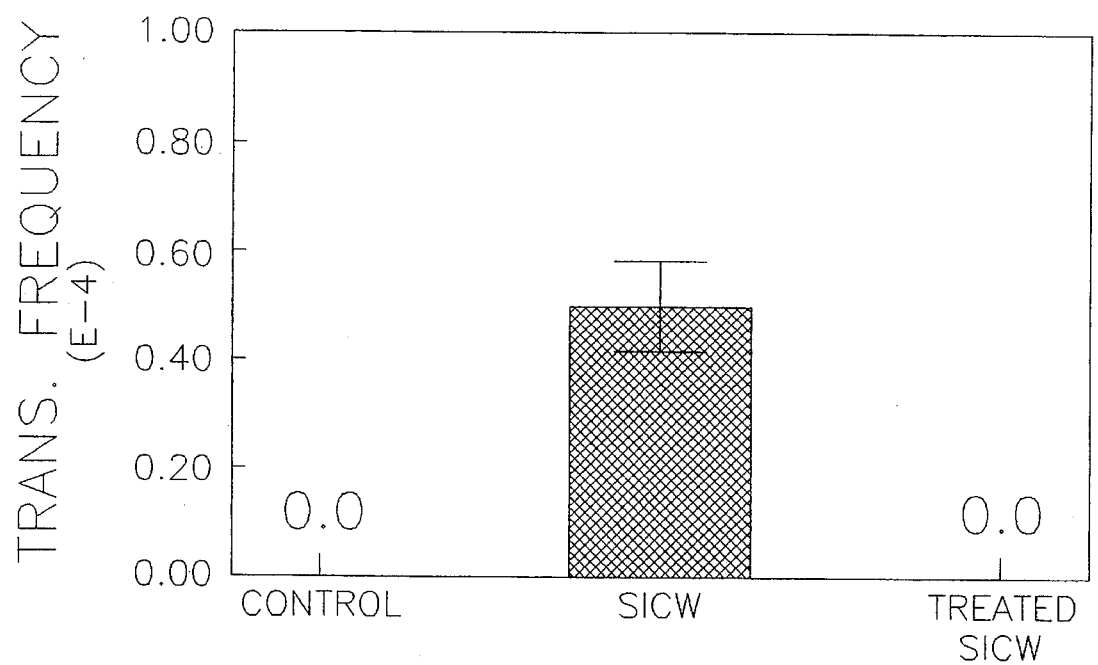
FIG. 5 depicts cell transformation assay (related to potential cancer formation) comparing treated and untreated fibers/whiskers, as well as a control, for mouse cells (results for human fetal lung cells are equivalent).

The results of such a study are shown in FIG. 5. In this particular test, neither the control nor the treated fibers/whiskers indicated any apparent transformation while the uncoated fibers/whiskers indicated significant transformation after four generations of growth.

The value of pre-coating fibers/whiskers prior to contact with human cells has also been investigated. The same types of tests as indicated above for mouse embryo cells were conducted using WI-38 fetal lung cells. Typical of the results is the colony forming efficiency when subjected to the two types of product. The results were equivalent to those for mouse embryo cells. As with the mouse embryo cells, the coated fibers/whiskers showed essentially the same colony forming efficiency as a control without contact with any fibers/whiskers. Untreated fibers/whiskers adversely affected colony growth.

The exact mechanism for the abatement of cytotoxicity of the fibers/whiskers is not known. From tests such as those that resulted in the data of FIGS. 4 and 5, it appears that the coating reduces or obscures charges carried on the surfaces of the native (uncoated) particles. The cells are not attracted to such altered particles, do not phagocytize (internalize)

them and are, thus, largely unaffected by the exposure. Further, the uncharged nature of the treated particles cause them, when placed in aqueous environments, to aggregate in hydrophobic masses that are too large to be considered respirable. Thus, durable changes in surface structure of mineral fiber/whisker which eradicate charge and confer hydrophobicity greatly reduce toxicity at the cellular level. This is believed to provide protection to the pulmonary system by forming non-respirable aggregates in the moist airways.

The above-cited organic halogenated silane or silicone materials provide a covalently bound surface coating that has the desired characteristics. Additional compounds of a similar nature are known to provide a non-wetting character to surfaces. Other materials that would exhibit similar characteristics are siloxanes which are used in industry for a wide number of applications.

From the above detailed description of the present invention, it will be apparent to one skilled in the art that a suitable treatment can be made to mineral fibers/whiskers that will abate cytotoxicity to mammalian cells normally exhibited by untreated mineral fibers/whiskers. Although the abatement has been described only with respect to basic test cells (mouse embryo cells and fetal lung cells), it is anticipated that such abatement will occur for other mammalian cells. The test conditions are given for a full description of the invention; thus, these conditions are given for illustration and not for limitation of the invention. Rather, the invention is to be limited only by the appended claims and their equivalents.

We claim:

1. Improved mineral fibers and whiskers exhibiting abatement of cytotoxicity toward mammalian cells which consist of mineral fibers and whiskers each completely coated with an agent that confers hydrophobicity to said fibers and whiskers, said agent selected from the group consisting of organic halogenated silanes and silicones.

2. The improved mineral fibers and whiskers of claim 1 wherein said agent is an organochlorosilane.

3. The improved mineral fibers and whiskers of claim 2 wherein said organochlorosilane is methylchlorosilane.

4. The improved mineral fibers and whiskers of claim 1 wherein said fibers and whiskers are silicon carbide fibers and whiskers.

* * * * *